United States Patent [19]

Denham et al.

[11] Patent Number: 4,472,669
[45] Date of Patent: Sep. 18, 1984

[54] COMPENSATED RESOLVER FEEDBACK

[75] Inventors: Edward L. Denham, Charlottesville; Michael J. Tuso, Afton, both of Va.

[73] Assignee: General Electric Co., Charlottesville, Va.

[21] Appl. No.: 452,747

[22] Filed: Dec. 23, 1982

[51] Int. Cl.³ .............................................. G05B 1/06
[52] U.S. Cl. .................................... 318/661; 318/632; 318/634; 340/347 SY
[58] Field of Search ............... 318/632, 634, 661, 605, 318/608; 340/347 SY

[56] References Cited

U.S. PATENT DOCUMENTS

| 3,519,904 | 7/1970 | Rogers. | |
|---|---|---|---|
| 4,010,463 | 3/1977 | Kay | 318/661 X |
| 4,023,085 | 5/1977 | Bishop et al. | 318/661 X |
| 4,268,786 | 5/1981 | Rohrle | 340/347 SY |
| 4,342,077 | 7/1982 | Passey et al. | |
| 4,349,822 | 9/1982 | Decalonne | 318/662 X |
| 4,352,050 | 9/1982 | Sakano | 318/632 X |
| 4,390,865 | 6/1983 | Lauro | 318/661 X |

Primary Examiner—B. Dobeck
Attorney, Agent, or Firm—Ormand R. Austin

[57] ABSTRACT

A method and apparatus by which the output value of a resolver position detection system is compensated for systematic phase shift errors produced by signal conditioning circuitry through which the signal passes.

10 Claims, 1 Drawing Figure

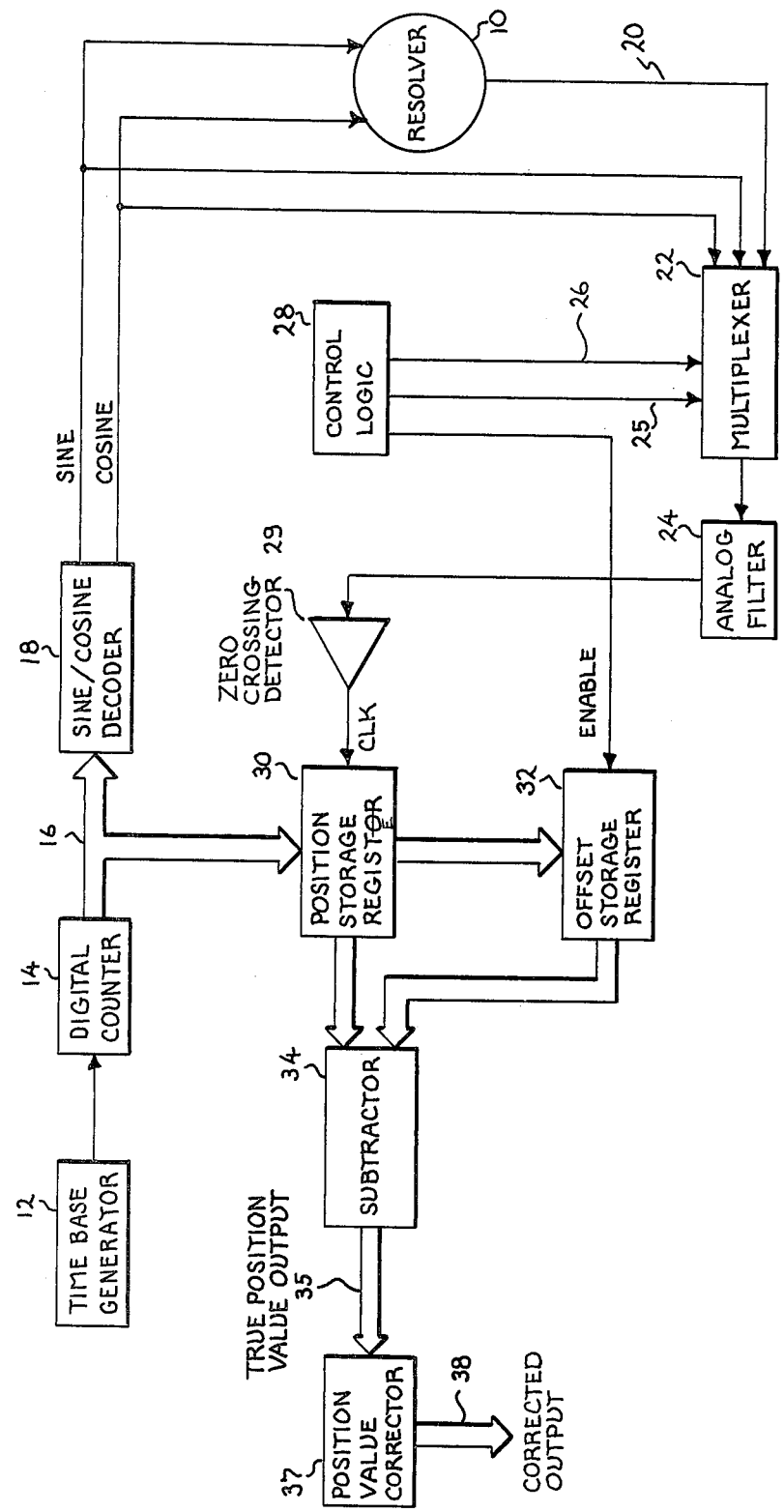

COMPENSATED RESOLVER FEEDBACK

This invention relates generally to position measurement and control systems and in particular to that aspect of such systems wherein it is desired to provide feedback information from a sensor disposed to monitor the position of a controlled machine member or other object.

BACKGROUND OF THE INVENTION

Resolver feedback has been used in position control systems for some time for monitoring the actual position of a machine member, or other object, whose position is being controlled. In these systems, the resolver is typically included in a servo loop to provide an indication of the actual position of the controlled object so that, by continuous comparison with a commanded position, an error signal is created for driving the servo loop. Operationally, a resolver is provided with a pair of excitation signals, most generally in the form of two sine waves of identical amplitude, and frequency, and are very carefully maintained at 90 electrical degrees in phase separation. In essence, therefore, the excitation signals are in the form of sine and cosine waves. The resolver output signal, on the other hand, is a third signal whose phase relationship with either of the excitation signals is indicative of the monitored position. Resolvers may, of course, be adapted to respond to either linear or rotary displacements.

Recently developed position control systems have utilized digital techniques for generation of the resolver excitation signals and for determination of the phase shift (hence, position) of the resolver output signal. By these techniques, such systems have become very precise, accurate, and reliable since the resolver drive signals and phase comparison functions are digital in nature, limited in accuracy substantially only by the precision of the time base. In fact, it is advantageous, in many respects, in a digital excitation system for a resolver, to use a notched square wave approximation of the sine and cosine wave forms. The resolver output signal remains fundamentally sinusoidal but it does become necessary to carefully condition this signal, removing harmonics so as to obtain the desired linearity between the monitored position and the measured phase shift. Analog filters are typically used for this purpose.

Unfortunately, the use of analog filters contributes many degrees of phase shift to the signal. In resolver terms, even one degree of phase shift represents a very significant position error (e.g., 360° of phase shift corresponds to an entire revolution of a resolver shaft). Any known, fixed amount of phase shift caused by the filter (or indeed by any other element or component in the circuit path of the resolver signal) can be accounted for and can quite simply be adjusted out. However, phase shifts caused by the effects of temperature and component aging are not accounted for in this manner. Furthermore, since the signal conditioning circuits (e.g., filters) are typically included as components on a single circuit board, phase shift variations from board to board produce position errors which necessitate readjustment whenever a board is replaced. Generally, upon board replacement, it is necessary to either realign the resolver or else determine a position offset and program it into the position control system as new setup data. Even these solutions, however, offer no relief from the phase shift errors caused by time and temperature effects.

Accordingly, it is among the objects of the present invention to provide a method and apparatus by which the output value of a resolver position detection system is compensated for systematic phase shift errors (i.e., those errors generally resulting from a system bias as exemplified by errors such as those discussed above) produced by signal conditioning circuitry through which the signal passes.

It is a further object of the invention to provide such method and apparatus whereby it becomes unnecessary to make readjustments of the resolver or its associated circuitry to overcome errors arising upon the replacement of circuitry used for conditioning the resolver output signal.

It is still further an object of the invention to provide a position indicative value derived from a resolver of a position control system such that position offsets arising from systematic phase shift errors do not have to be programmed into the system in order to compensate for such phase shift errors.

SUMMARY OF THE INVENTION

These and other objects are obtained in a preferred form of the invention by selectively passing at least one of the resolver excitation signals (as a reference signal) through the same circuit path as that through which the resolver output signal passes in having its phase shift determined. The phase shift induced into the passed reference signal by the circuit path is then determined and a value indicative of that phase shift is produced and stored. The stored value is thus indicative of the systematic phase shift produced by the circuitry through which the resolver output signal normally passes.

The resolver output signal is then passed through the same circuit path and its phase shift with respect to the reference signal is determined, producing thereby a value indicative of the total phase shift; i.e., indicative of the apparent position of the monitored object. The first value, indicative of the systematic phase shift, is then subtracted from the second to produce a compensated value, indicative of the true position of the monitored object.

These processing procedures may be continuously repeated to provide a substantially continuous measurement of the true monitored position.

DETAILED DESCRIPTION OF THE INVENTION

In the drawing, schematically illustrating a preferred form of the invention, resolver 10 is set up to monitor the relative position of an object disposed to cause rotation of the resolver shaft (the shaft and monitored object are not specifically illustrated). Commonly, resolvers such as that illustrated may be employed, as was mentioned above, in a position control system for generation of a position feedback signal within a servo control loop. In any case, resolver 10 is excited, or driven, by a pair of signals, each one of which is essentially sinusoidal in form. These excitation signals are identical in amplitude and frequency and are separated in phase from each other by 90 electrical degrees. In substance, therefore, the excitation signals comprise sine and cosine wave signals.

These signals are preferably generated by using digital circuitry producing notched square wave approximations of the sine and cosine wave signals. In the notched square wave approach, the digital excitation signals are switched on and off in a periodic pattern which results in a reduced harmonic content when compared with the harmonic content of square wave excitation signals. Digital techniques for resolver excitation are well known as exemplified by U.S. Pat. No. 3,519,904 which discloses means for square wave excitation of a resolver. In fact, operative details of many of the individual elements of the drawing are not necessary for a full understanding of the invention; such being readily apparent to one of ordinary skill in the art given the ensuing description.

Thus, time base generator 12 provides a very stable, periodically varying signal which is applied as the input signal to a digital counter 14. Time base generator 12 may simply be a very stable, crystal controlled oscillator operating at a frequency, for instance, of about 2.5 MHz. Counter 14 is incremented in its count value with each clock cycle, counting up until the counter is full, at which point it rolls over and begins counting from zero again. The total count is chosen to give the desired resolution of resolver shaft angular position. For example, counter 14 may be arranged to count from 0 to 999, rolling over repeatedly so long as the input clock signal from time base generator 12 is being supplied.

The count value from digital counter 14 is continuously applied, via a signal bus 16, to a sine/cosine decoder 18. The decoder 18 converts the continuously running count value to two signals forming the sine and cosine wave forms necessary for excitation of resolver 10, as was mentioned above. Implementation of sine/cosine decoder 18 may be by any number of known techniques, but for use in combination with the present invention, sine/cosine decoder 18 preferably is of the type which makes use of a programmable read only memory (PROM) from which values are called to approximate the desired wave forms. That is, there is a one-to-one correspondence between the count value from counter 14 and the stored wave form value. A programmable read-only memory suitable for use in the invention is the model TBP18S42 available from Texas Instruments, Incorporated. The sine/cosine signals may be in the form of notched square waves, approximating sine and cosine waves as was mentioned above. In any case, the sine and cosine signals are separated in phase from each other by 90 electrical degrees. It may be noted that use of notched square wave excitation allows the phase relationship of the excitation signals and their amplitudes to be very precisely controlled.

The output signal from the resolver (which may, in a position control system, be referred to as the feedback signal) is applied, via line 20, as one input to a signal multiplexer 22. The sine and cosine excitation signals are applied as separate input signals to the multiplexer 22. The phase separation of the feedback signal from either of the sine or cosine excitation signals is a measure of displacement sensed by the resolver 10.

Multiplexer 22 (essentially a switching device, e.g., a suitable multiplexer is the model MC 14052B available from Motorola, Incorporated) serves to select one or the other of the three input signals as the output signal to be passed to analog filter 24. The signal selected by multiplexer 22 is determined by control lines 25 and 26 which may be variously programmed or controlled through control logic network 28 to determine which signal appears at the multiplexer output. For example, lines 25 and 26 may be cycled such that each input signal appears periodically at the output; alternatively, selection may be under an operator's control or may be such that one of the excitation signals appears momentarily at the multiplexer output only upon initial system power application.

Analog filter 24 is a signal conditioning network for filtering the resolver output signal to eliminate harmonic distortion and extraneous noise signals. The position indicative signal, with harmonic content and noise filtered out, is thus presented to subsequent circuitry as substantially a pure sine wave. A sine wave is necessary for the highest accuracy when sensing position with a resolver since maximum linearity of the measurement depends on the signal being in sine wave form.

The filtered signal from filter 24 passes to a zero-crossing detector 29 (of conventional design, e.g., configured with an LM-311 comparator from National Semiconductor, Incorporated) which generates an output signal at such times as the filtered signal crosses the zero voltage point, for example, in the positive direction. The output signal from zero-crossing detector 29 is applied to the clock input terminal of position storage register 30. Storage register 30 is also connected by way of signal bus 16 to receive the count value from counter 14. Thus, the count value which occurs substantially simultaneously with the zero-crossing of the filtered signal is saved in position storage register 30. The count value stored in position register 30 is indicative of the separation in phase between the filtered signal and the reference signals (i.e., the sine and cosine excitation signals). If the filtered signal is the resolver output signal, the stored count is indicative of the monitored position. It is to be noted, however, that the count value in such case is partly due to phase shifts systematically induced by the analog filter 24 and by any other phase shifting means in the circuit path. Thus, the stored count, without compensation, is indicative only of the apparent position of the monitored device and not its true position.

While analog filter 24 is necessary in order to eliminate harmonic distortion, it, and any associated components directed to the signal conditioning function, induce a sizeable phase shift into the signal which is passed. Since the amount of phase shift in the resolver output signal is indicative of the measured variable, any fixed or extraneous phase shift induced by the circuitry through which the signal passes amounts to a systematic error. By the present invention the resolver output signal is compensated for such systematic errors.

Compensation is obtained as follows. By operation of control logic network 28, one of the input reference signals (i.e., the sine or cosine excitation signal) is selected to be passed to the analog filter 24 through multiplexer 22 and through the circuit path followed by the resolver output signal. The selected signal actuates zero-crossing detector 29 and causes a count to be stored into position storage register 30. Notable, at this point, is the fact that the stored count is representative of the phase shift induced by the filter 24 and is independent of the resolver phase shift; i.e., the count is indicative only of the systematic phase shift which is unrelated to the phase shift produced in the resolver.

Under these circumstances, and upon generation of an enabling signal by control logic 28, the stored count representing the offset, or systematic error, is transferred to an offset storage register 32. The count stored in offset register 32 is therefore a value indicative of phase shift induced by circuitry through which the resolver output signal passes.

Subsequently, control logic 28 causes multiplexer 22 to again pass the resolver output signal. As described above, position storage register 30 again assumes a count value indicative of the apparent monitored position. The count values from position storage register 30 and from offset storage register 32 are then passed to a subtractor 34 which subtracts the offset value of register 32 from the apparent position value of register 30. Thus, a value representative of the systematic phase shift error has been subtracted from the apparent position signal. In essence, the systematic phase shift error has been subtracted out, or compensated for, and the output signal from subtractor 34, appearing at line 35, is representative of the true position of the monitored object.

Although the value at line 35 represents the true position, it will be recognized that, under some circumstances, the subtraction process may produce a negative value at line 35. When this occurs, it may be desirable to translate the negative value back into the positive range. This amounts to a straightforward mapping of resolver angle into positive position values. As an example, assume that counter 14 has a rollover point of 999. It is then possible for position storage register 30 and offset storage register 32 to contain any count value between zero and 999 where each count represents 0.36 degrees of phase shift. It may occur that offset register 32 contains a count value of 200 indicative of systematic phase shift and position storage register 30 contains a count of 950 indicative of apparent monitored position. Subtractor 34 would then yield a true position value of 750. If resolver shaft position remains fixed and a 36 degree increase in systematic phase shift occurs, offset storage register 32 would contain a value of 300b and position storage register 30 would contain a value of 50. Subtractor 34 would then yield a true position output of −250. It is apparent that values on line 35 of +750 and −250 both represent the same resolver shaft position.

The occurrence of negative values on line 35 is corrected for simply by adding the count capacity of the counter 14 to the negative value. For the example set forth above, adding 1,000 counts (the count capacity of counter 14) to −250 produces +750, the desired value. Positive values on line 35 require no translation.

Thus, position value translator 37 includes logic which detects the occurrence of a negative count value at line 35 and then causes the addition of a fixed value, equal to the capacity of counter 14, to the negative value. It will be noted that the fixed value is also equal to the counts per revolution of the shaft of resolver 10; i.e., 1000 counts per revolution (i.e., per 360°) in the present example. The translated value appears on output line 38.

To those of skill in the art, it will be apparent from the above that offset storage register 32 may be updated upon various time schedules, more or less frequently, as required to compensate for the effects of temperature and component aging. In simplest form, the offset value in register 32 may be updated only upon changing that particular circuit board incorporating filter 24. In such case, multiplexer 22 and control logic 28 may simply be in the form of manual selector switches under the control of operating personnel. Such switches would permit selection of the appropriate input signal to the filter (at the desired time) and would enable the offset storage register 32 to obtain and hold the offset value. Preferably, the control logic and the subtraction and correction processes are implemented with a microprocessor (e.g., an Intel 8085 microprocessor) having a stored program of operation. Position and offset storage registers, 30 and 32, respectively, may be implemented with D-type flip-flops such as the 74LS374 and 74LS173, available from a number of commercial sources including Texas Instruments, Incorporated.

It will also be recognized that the operating sequence may be varied from that described above while achieving the same result. For example, the apparent position value, or count, may be stored prior to acquiring the offset count and then the subtraction operation carried out. Thus, the order of acquisition of the apparent position value and the offset value may be varied; however, the sequence described above is preferred. Additionally, the position storage register 30 and the offset storage register 32 may be repeatedly updated to provide a substantially continuous indication of the true position of the monitored object.

It will be appreciated that the foregoing has described a method and apparatus by which an output value from a position detection system is produced which depends entirely on the position of the resolver shaft and not on the phase shift stability of the signal processing circuitry.

Thus, while there has been shown and described what is considered a preferred embodiment of the invention, it is understood that various other modifications may be made therein. It is intended to claim all such modifications which fall within the true spirit and scope of the present invention.

The invention claimed is:

1. For use in conjunction with a resolver and its operative circuitry, the resolver being disposed for monitoring the relative position of an object, a method providing a position indicative value compensated for errors caused by systematic phase shifts in the resolver output signal with respect to reference signals, comprising the steps of:
   (a) providing the reference signals as excitation for the resolver, the resolver being responsive to produce said output signal such that its phase relationships with the reference signals are indicative of the monitored position;
   (b) passing at least one reference signal through substantially the same circuit path as that through which the resolver output signal passes to thereby generate a phase shift value indicative of the amount of systematic phase shift induced by said circuit path;
   (c) determining the amount of phase shift between the resolver output signal and said at least one reference signal after passing the resolver output signal through said circuit path, to provide a value indicative of the apparent monitored position; and
   (d) subtracting said phase shift value of step (b) from the apparent position indicative value of step (c) to provide a compensated position value indicative of the true monitored position.

2. The method of claim 1 wherein the phase shift value is stored and is then subtracted from the apparent position indicative value in accordance with step (d).

3. The method of claim 1 wherein step (c) is performed prior in time to step (b).

4. The method of claim 2 wherein the steps (a), (c), and (d) are continuously repeated to provide a substantially continuous indication of the monitored position.

5. The method of claim 2 wherein steps (a), (b), (c), and (d) are continuously repeated to provide a substantially continuous indication of the monitored position.

6. For operation in combination with a resolver disposed for monitoring the relative position of an object and with signal conditioning circuitry for conditioning the resolver output signal, apparatus providing a position indicative value compensated for phase shift errors induced by said signal conditioning circuitry, comprising:

(a) means providing at least one reference signal as excitation for the resolver, the resolver being responsive to produce said output signal such that its phase relationship with the reference signal is indicative of the object's position;

(b) switching means receiving the reference signal and the resolver output signal for selecting one or the other to pass through the signal conditioning circuitry;

(c) phase shift detecting means receiving the signal from the signal conditioning circuitry to provide an output value indicative of the phase relationship between the reference signal and the received signal whereby the output value is indicative of the object's apparent position when the received signal is the resolver output signal and indicative of phase shift error when the received signal is the reference signal;

(d) means for storing the output value from said phase shift determining means when said value is indicative of the phase shift error; and, (e) means for subtracting the stored value from the apparent position indicative value to produce the compensated position indicative value.

7. The apparatus of claim 6 wherein:

(a) said means providing at least one reference signal comprises a digital counter adapted to have its count value continuously incremented, and a decoder continuously decoding the count value of said counter to produce said reference signal; and, (b) said phase shift detecting means comprises a first digital storage register receiving the count value from said counter, and a zero-crossing detector responsive to the received signal to cause said storage register to hold the count value occurring substantially simultaneously with the occurrence of a zero-crossing of said received signal.

8. The apparatus of claim 7 wherein said switching means comprises a signal multiplexer.

9. The apparatus of claim 8 wherein said means for storing the output value from said phase shift determining means when said value is indicative of the phase shift error comprises a second digital storage register.

10. The apparatus of claim 9 further including means for translating negative values of the position indicative value to corresponding positive values thereof.

* * * * *